April 19, 1966  A. LOSSEV  3,246,709
PARKING ATTACHMENT FOR MOTOR VEHICLES
Filed May 18, 1962  3 Sheets-Sheet 1

INVENTOR:
Alexander Lossev

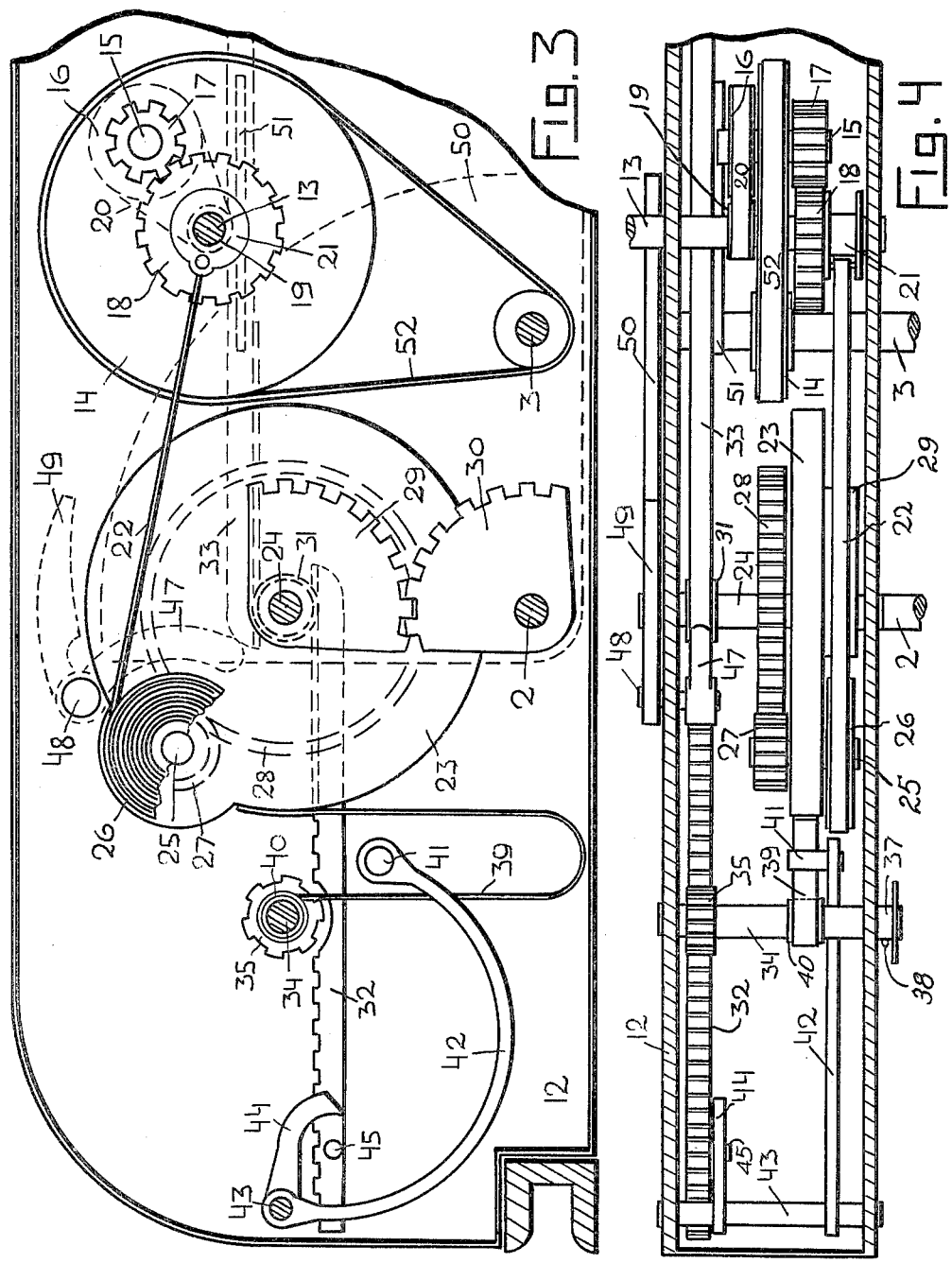

April 19, 1966  A. LOSSEV  3,246,709
PARKING ATTACHMENT FOR MOTOR VEHICLES
Filed May 18, 1962  3 Sheets-Sheet 1

INVENTOR:
Alexander Lossev

United States Patent Office 3,246,709
Patented Apr. 19, 1966

3,246,709
PARKING ATTACHMENT FOR MOTOR VEHICLES
Alexander Lossev, 44 Union St., Montclair, N.J.
Filed May 18, 1962, Ser. No. 195,905
2 Claims. (Cl. 180—1)

The present invention relates to the motor vehicles and more particularly to vehicles equipped with the rear end springs, such as automobiles. The object of this invention is to provide means for moving the rear end of a vehicle laterally without impairing the performance, style or construction of the vehicle. Such means will facilitate and speed up a maneuver of parking a vehicle into a limited space along the curb or removing it therefrom. Furthermore such means will be able to turn a vehicle into a diametrically opposite position in one swift motion. A characteristic of the latter kind may be of specific importance for the military, police or any other vehicles.

Figure 1:
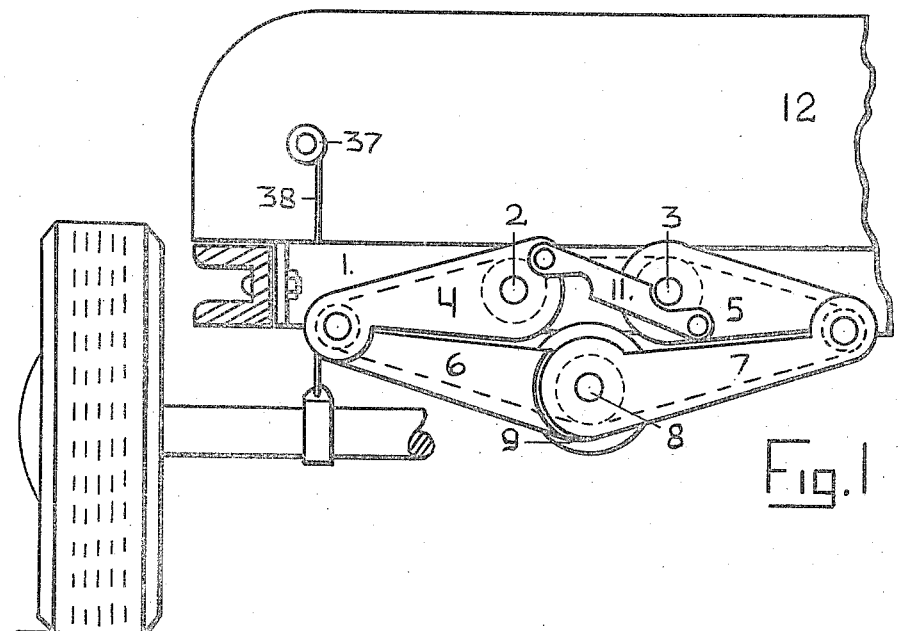
Figure 2:
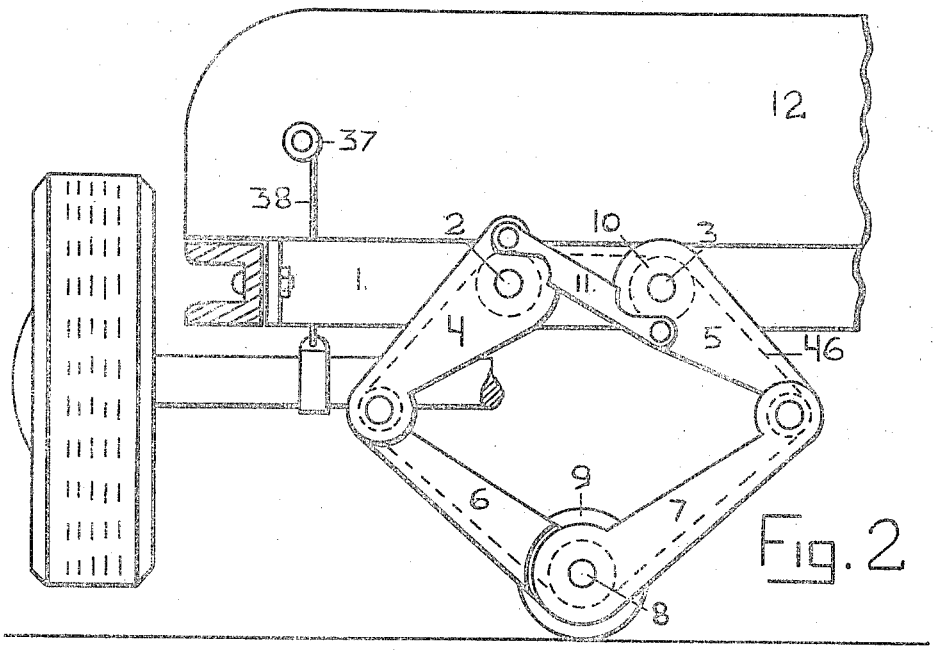
Figure 1:
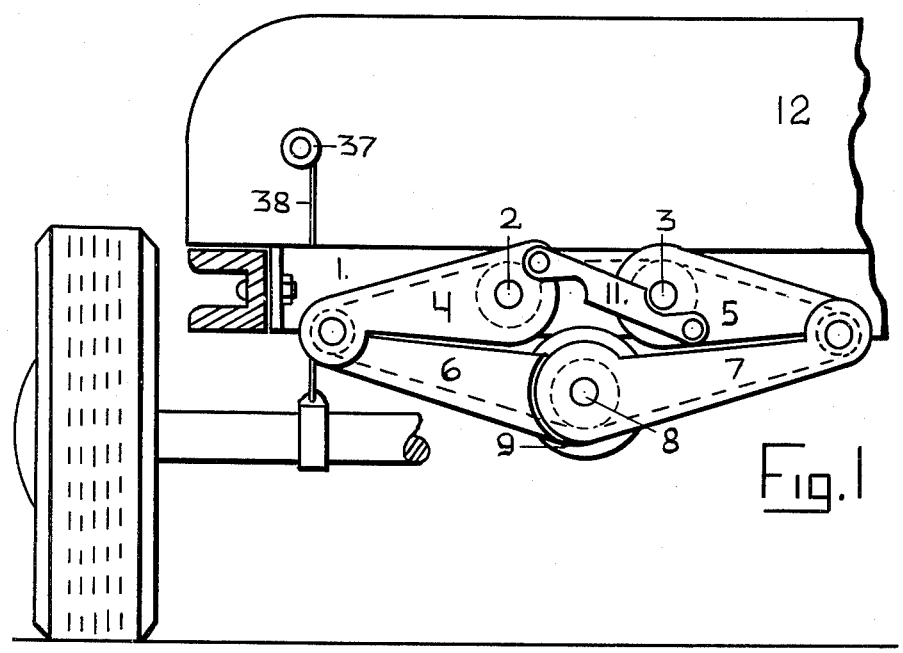
Figure 2:
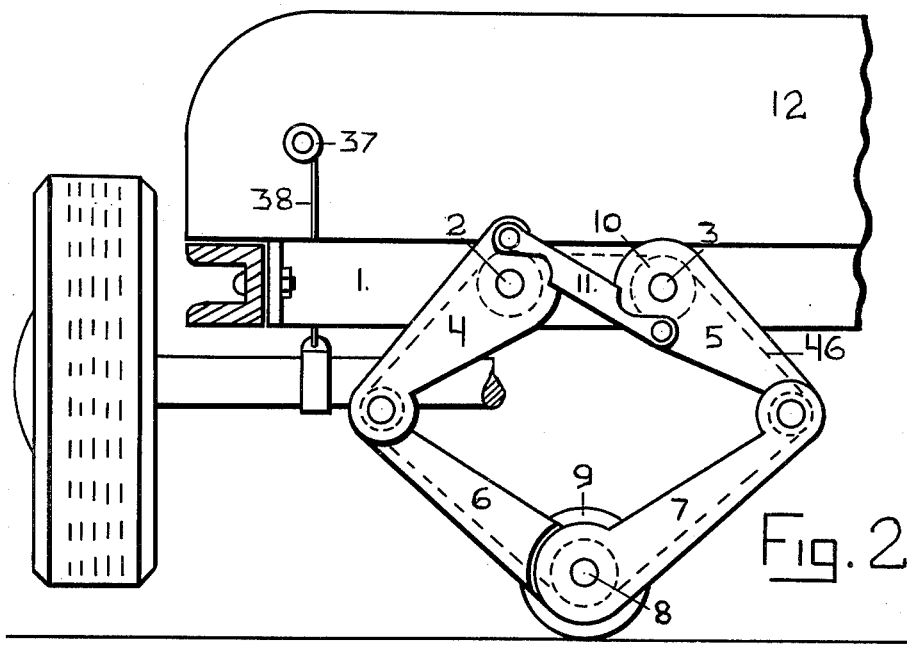

Since a sideways motion of automibiles is an acute problem, many attempts have been made in the past to solve it. The present invention differs from all the prior art in the very idea, as well as in the ways this idea is carried out. It is fully described in the following specification and illustrated in the accompanying drawings, in which:

FIGURE 1 is a rear elevation illustrating the invention in an inoperative position, FIGURE 2 is a similar view of the contrivance in operative position with the rear wheels of the vehicle raised off the ground, FIGURE 3 is an interior view of the operative mechanism revealing details thereof, FIGURE 4 is an interior plan view of the operative mechanism, FIG. 5 and FIG. 6 show two various details of the operative mechanism.

Referring more particularly to the characters of reference on the drawings, the numeral 12 denotes a housing of the operative mechanism secured to the underframe of the vehicle. The numeral 1 denotes a strong crossbar fixedly secured to or formed integral with said underframe. Extending between the housing 12 and the crossbar 1 and rotatably supported thereby are an arbor 2 and a propeller shaft 3. A lever 4 is fixedly set upon and moved by the arbor 2 and a lever 5 is loosely mounted on the propeller shaft 3. The levers 4 and 5 are pivoted together with levers 6 and 7 and the latter are pivotally joined by an axle 8. In that way the described set of levers forms a folding framework supported on the crossbar 1 and adapted to be folded or unfolded by rotation of the arbor 2. An auxiliary wheel 9 is rotatably mounted on the axle 8 and is carried by said framework vertically into and out of the ground engaging position. In retracted position the framework is folded together and the auxiliary wheel placed off the ground so that a complete road clearance is available. A turn of the arbor 2 counterclockwise, as viewed in the FIGURE 2, will turn the lever 4 in the same way and unfold the framework bringing the auxiliary wheel 9 down to the ground into an operative position. The lever 4 is connected with the lever 5 by a strong beam 11 supporting motion or position of the lever 5. In the way described thereinafter the propeller shaft 3 imparts rotary motion to the auxiliary wheel 9 by means of a pulley 10 and an endless belt 46. A set of rollers loosely mounted on the arbor 2 and on the pivots joining the levers 4 with 6 and 5 with 7 will guide and tension the belt 46 in any position of the folding framework. It may be also positioned and used as a mount for the spare wheel, whereby the latter will serve in the same manner as the described auxiliary wheel 9.

The operative mechanism, specifically depicted in FIGURES 3 and 4, is adapted to receive motion from a driving source, not shown in the drawings, in a customary manner. The numeral 13 denotes a shaft journalled in the housing 12 and activated by said driving source. A discwheel 14 is loosely mounted on the driveshaft 13 and by means of an endless belt 52 is operatively connected to the propeller shaft 3. A pulley 16 and a pinion 17 are fixedly set upon a pin 15 and the pin 15 which is rotatably supported on the disc wheel 14. By means of a pulley 19 and a belt 20 the drive shaft 13 is operatively connected to the pulley 16 and the pinion 17. A geared wheel 18, loosely mounted on the shaft 13, meshes with the pinion 17. When the discwheel 14, by means described thereinafter, is prevented from rotation the pinion 17 will drive the geared wheel 18. Subsequently the discwheel 14 will be released but the geared wheel 18 will be prevented from further rotation by increasing resistance of the rear springs of the vehicle and the pinion 17 will run around the geared wheel 18 in a planet gear motion and drive the discwheel 14. The later by means of the belt 52 will impart motion to the propeller shaft 3. The numeral 21 denotes a take-up reel loosely mounted on the shaft 13 and fixedly secured to and driven by the geared wheel 18.

An axle 24 rotatably supported in the housing 12 bears a disc 23 loosely mounted thereupon. A wind-off spool 26 and a pinion 27 are fixedly set upon a pin 25 and rotatably supported on the face of the disc 23. A geared wheel 28, fixedly mounted on the axle 24, meshes with the pinion 27. The numeral 22 designates a belt one end of which is attached to and wound upon the wind-off spool 26, but the other end is hinged to the take-up reel 21 driven, as described, by the geared wheel 18. Rotation of the take-up reel 21 in any direction will wind the belt 22 thereupon and draw it off the spool 26 imparting rotary motion to the latter and the pinion 27. When, by means described thereinafter, the geared wheel 28 is prevented from motion the pinion 27 will travel on the perimeter thereof and turn the disc 23 clockwise, as viewed in FIGURE 3. A toothed sector 29, firmly fixed to and moving with the disc 23, meshes with a similar toothed sector 30, firmly set upon the arbor 2. Motion of the sector 30 will turn the arbor 2 and unfold the framework, as described before, bringing the auxiliary wheel 9 down into contact with the ground. When the auxiliary wheel 9 reaches the ground the weight of the vehicle will force the pinion 27 to perform in the direction of lesser resistance and drive the geared wheel 28. The latter will be released by means described thereinafter. Motion of the geared wheel 28 will turn the axle 24 and a gear 31 fixedly mounted thereupon. The latter meshes with two racks 32 and 33 slidably supported on the wall of the housing 12 and moves them in opposite directions. A spindle 34, supported by the walls of the housing 12, carries a pinion 35. Since a portion of the rack 32, adjacent the pinion 35, is missing the rack 32 does not mesh with the pinion 35 and the latter with the spindle 34 may rotate freely. The sliding motion of the rack 32 to the right as viewed in FIG. 3 will engage and drive the pinion 35 and the spindle 34 counterclockwise. The spindle 34 is provided with a cylinder 37 upon which one end of a cable 38 is wound. The other end of the cable 38 is attached by usual means to the rear axle of the vehicle. During raising and lowering of the vehicle chassis, the rear springs of the vehicle are changing the distance between the rear axle and the underframe of the vehicle. The spindle 34, equipped with a spring 53, shown in FIG. 5, is aranged to turn in reaction to such changes and wind the cable 38 on or off the cylinder 37 keeping it tense all the time. A similar arrangement is provided for the opposite side of the vehicle but is not shown in the drawings. Winding the cables upon the cylinders will raise the rear wheels off the ground and leave the rear of the vehicle supported by the unfolded framework and the auxiliary wheel 9.

Dimensions of some vehicles may permit the substitution of flexible cables and cylinders by geared bars adjusted to the rear axle and meshing with pinions upon the described spindles as shown in FIG. 6, whereby the reciprocating vertical motion of the bars will impart an alternate rotary motion to the spindles and the springs thereupon will be not necessary.

A hook 44 and an arm 42 are fixedly set upon a shaft 43 journalled in the housing 12. The hook 44 in coaction with the pin 45 on the sliding rack 32 locks the latter in a neutral position as is shown in the FIGURE 3. A flexible strip 39, having the ends fastened to and arranged to be wound on or off the pulley 40 and the disc 23, forms a U-shaped loop. The pulley 40 fixedly mounted on the spindle 34 winds on or off one end of the strip 39 and moves the loop up or down depending on position of the spindle 34 in respect to the rear axle of the vehicle. The disc 23 winds the other end of the strip 39 and raises the loop into contact with the pin 41 moving the arm 42. The latter by means of the shaft 43 will lift the hook 44 and release the sliding rack 32. Dimensions of the parts involved in this operation have to be conformed in order to release the sliding rack 32 in the very moment when the auxiliary wheel 9 will touch the ground.

The numeral 49 designates an arm pivotally supported by a pin 48 on the outer side of the housing 12. The theretofore described movement of the rack 33 will turn a lever 47 and the pin 48. The latter will move the arm 49 into locking contact with a strong sector 50 firmly set upon and moved by the arbor 2. In that way the arbor 2 will be and stay locked as long as the rack 33 will remain in the operative position. The concave surface of the arm 49 and the convex surface of the sector 50 may be provided with means for a stronger locking contact.

A bar 51 fixed to the sliding rack 33 is in the course of the jutting portion of the pin 15 and prevents the discwheel 14 from rotation. The sliding motion of the rack 33 will move the bar 51 aside and release the discwheel 14. The latter will be driven by the planet wheel motion of the pinion 17 and by means described theretofore transmit rotary motion to the auxiliary wheel 9. It is apparent to any person skilled in the art that the object of this invention stated in the introduction of this specification is fully attained and the described contrivance or installation thereof will not impair the performance or style of the vehicle and will not require any alteration in construction thereof.

The operative mechanism, described in details theretofore, may be driven by an electric motor or any other motive power. In consecutive order the operative mechanism will, by means of the arbor 2, unfold and lock the framework carrying the auxiliary wheel 9 into ground engaging position. Further the operative mechanism will raise the rear wheels off the ground and transpose the support of the underframe to the folding framework and the auxiliary wheel 9 locked in a ground engaging position. Subsequently, the operative mechanism will drive the auxiliary wheel moving the rear of the vehicle laterally in a desirable direction. Disengagement of the power means will return the rear wheels to the ground, unlock and fold the framework raising the auxiliary wheel into operative position. For that purpose the arbor 2, the locking arm 49 and the sliding racks 32 and 33 are retractively activated in a customary manner by springs not shown in the drawings.

In the course of a parking maneuver into available space along the curb, the vehicle has to be driven at an angle to the curb. When the front of the vehicle will be in a proper position in respect to the curb and the car parked ahead, the described contrivance may be set in motion and move the rear of the vehicle to the curb. As a matter of course this contrivance does not have to be operated when the vehicle is moving and ordinary means rendering the contrivance operable only when the selector lever of the vehicle is shifted into the parking position or other means may be employed as a measure of precaution.

In order to remove the vehicle from the parking space the contrivance has to be set in motion in the opposite direction, whereby the folding framework and the wheel raising means will perform in the same manner, but the rear of the vehicle will move in the opposite direction. When the vehicle will bemoved far enough to clear the car parked in the back, the vehicle can be backed out of the parking space in the conventional manner.

In order to turn the vehicle into a diametrically opposite position in one swift motion the described contrivance may be operated in the same manner and carry the rear of the vehicle laterally, in a circular course about the middle of the front axle as a center. During such maneuver the front wheels of the vehicle will turn on their axle in the opposite direction, providing an easy and smooth turn of the vehicle.

While one embodiment of this invention has been disclosed, it is to be understood that the inventive idea may be carried out in a number of ways. Illustrative of this would be the fact that geared means may substitute the flexible, other conveying means may be employed instead of described and other variations may be made in the structure without departing from the spirit of this invention. This application is therefor not to be limited to the precise details described, but is intended to cover all variations and modifications thereof falling within the spirit of this invention and the scope of appended claims.

I claim:

1. In a device of the character described, an operative mechanism including a housing thereof secured to the underframe of the vehicle, a strong crossbar fixedly secured to said underframe, an arbor and a propeller shaft rotatably supported by said crossbar and extending into operative engagement with said mechanism, a folding framework comprising a combination of pivoted together levers jointly supported by said arbor and propeller shaft, an auxiliary wheel rotatably mounted on said framework and adapted to be moved thereby into or out of engagement with the ground, transmission means operably connecting said auxiliary wheel to said propeller shaft, said operative mechanism compriisng a drive shaft journalled in said housing and adapted to receive motion from a driving source, a discwheel rotatably supported on said drive shaft, means operatively connecting said discwheel to aforesaid propeller shaft, a pinion rotatably positioned on the face of said discwheel, means forming driving relation between said pinion and said drive shaft, a geared wheel rotatably supported on said drive shaft in meshing engagement with said pinion, a take-up reel secured to driven by said geared wheel, an axle journalled in said housing, a disc rotatably supported on said axle, a wind-off spool and a pinion combined by a pin rotatably positioned on the face of said disc, a geared wheel fixedly set upon said axle in meshing engagement with said pinion, flexible means wound upon said wind-off spool and having one end attached to said take-up reel, a geared sector fixedly secured to said disc and operably engaged to a similar sector fixedly set upon said arbor, two spindles rotatably supported in said housing and having pinions mounted thereon, a gear fixedly set upon and driven by said axle, two geared members slidably supported on the wall of said housing in meshing relation with said gear and adapted to be moved thereby into driving engagement with said last mentioned pinions, flexible means attached to the rear axle of the vehicle and arranged to be wound upon said spindles, spring means adjusted to said spindles whereby any change in position of said rear axle in respect to said spindles will cause or be caused by rotation of the latter, means supported on the wall of said housing in locking relation with one of said geared members, flexible means attached to and reciprocally wound upon said disc and one of said spindles into releasing contact with said locking means.

2. In a device of the character described, an operative mechanism including a housing thereof secured to the underframe of the vehicle, a strong crossbar fixedly secured to said underframe, an arbor and a propeller shaft rotatably supported by said crossbar and extending into operative engagement with said mechanism, a folding framework comprising a combination of pivoted together levers jointly supported by said arbor and said propeller shaft, conveying means supported on said framework and adapted to be moved thereby into or out of engagement with the ground and to be driven by said propeller shaft, said operative mechanism comprising a revolvable shaft journalled in said housing and adapted to receive motion from a driving source, a discwheel rotatably mounted on said drive shaft, means operatively connecting said discwheel to aforesaid propeller shaft, a pinion rotatably positioned on the face of said discwheel, means forming driving relation between said pinion and said drive shaft, a geared wheel rotatably supported on said drive shaft in meshing engagement with said pinion, a take-up reel secured to and driven by said geared wheel, an axle journalled in said housing, a disc rotatably supported on said axle, a wind-off spool and a pinion combined by a pin rotatably positioned on the face of said disc, a geared wheel fixedly set upon said axle in meshing engagement with said pinion, flexible means wound upon said wind-off spool and having one end attached to said take-up reel, a geared sector fixedly secured to said disc and operably engaged to a similar sector fixedly set upon said arbor, two spindles rotatably supported in said housing and having pinions mounted thereon, a gear fixedly set upon and driven by said axle, two geared members supported on the wall of said housing in meshing relation with said gear and adapted to move thereby into driving engagement with said last mention pinions, geared means attached to the rear axle of the vehicle in meshing engagement with pinions upon said spindles whereby any change in position of the rear axle in respect to said spindles will cause or be caused by rotation of the latter, means supported on the wall of said housing in locking relation with one of said geared members, means positionally associated with and reciprocally activated by motion of said disc and one of said spindles for release of said one of said geared members.

References Cited by the Examiner
UNITED STATES PATENTS

| | | | |
|---|---|---|---|
| 1,591,680 | 7/1926 | Pengilly | 180—1 |
| 1,884,933 | 10/1932 | Walker | 180—1 |
| 2,158,891 | 5/1939 | Beacher | 180—1 |
| 2,593,024 | 4/1952 | Hall et al. | 180—1 |
| 2,700,426 | 1/1955 | Harless | 180—1 |
| 2,708,002 | 5/1955 | Carpenter | 180—1 |

A. HARRY LEVY, *Primary Examiner.*